(12) United States Patent
Rice (10) Patent No.: US 10,739,024 B2
(45) Date of Patent: Aug. 11, 2020

(54) AIR CONDITIONING SYSTEM AND METHOD WITH CHILLER AND WATER

(71) Applicant: SEMCO LLC, Columbia, MO (US)

(72) Inventor: Thomas Rice, Columbia, MO (US)

(73) Assignee: SEMCO LLC, Columbia, MO (US)

( * ) Notice: Subject to any disclaimer, the term of this patent is extended or adjusted under 35 U.S.C. 154(b) by 161 days.

(21) Appl. No.: 15/866,940

(22) Filed: Jan. 10, 2018

(65) Prior Publication Data

US 2018/0195745 A1    Jul. 12, 2018

Related U.S. Application Data (60) Provisional application No. 62/445,060, filed on Jan. 11, 2017.

(51) Int. Cl.
| | |
|---|---|
| *F24F 5/00* | (2006.01) |
| *F24F 3/14* | (2006.01) |
| *F24F 12/00* | (2006.01) |
| *F25B 25/00* | (2006.01) |
| *F25B 29/00* | (2006.01) |

(52) U.S. Cl.
CPC .......... *F24F 5/0007* (2013.01); *F24F 3/1423* (2013.01); *F24F 5/0017* (2013.01); *F24F 5/0035* (2013.01); *F24F 12/002* (2013.01); *F24F 2005/0025* (2013.01); *F24F 2203/1032* (2013.01); *F25B 25/005* (2013.01);
(Continued)

(58) Field of Classification Search
CPC ............. F24F 5/0007; F24F 2203/1032; F24F 12/002; F24F 3/1423; F25B 2339/047; F25B 25/005; F25B 25/003; H05K 7/20654

See application file for complete search history.

(56) References Cited

U.S. PATENT DOCUMENTS 3,028,735 A * 4/1962 Divine .................... F22B 31/04
                                                          62/260
3,127,928 A * 4/1964 Ringquist ................. F24F 3/08
                                                          165/221
(Continued)

FOREIGN PATENT DOCUMENTS

| JP | 10185342 | 7/1998 |
|---|---|---|
| WO | 9310403 | 5/1993 |
| WO | 9414011 | 6/1994 |

OTHER PUBLICATIONS

Semco, Econet Premium, 2017.
Semco, Econet Liquid Cooled Heat Exchanger, 2017.
Flakt Woods, Econet Standard, 2016.
(Continued)

*Primary Examiner* — Paul Alvare
(74) *Attorney, Agent, or Firm* — Allan Watts (57) ABSTRACT

Air conditioning systems and methods for cooling a space that include a chiller, a cooling coil, a heat sink, various water conduits, and a pump. Different modes of operation are used under different conditions and the water is routed differently in different modes. In a first mode, the chiller rejects heat to water returning from the cooling coil, and in a second mode, there are separate loops of chilled and heated water with separate pumps. In a third (economizer) mode of operation, the chiller is off and water from the heat sink is delivered to the cooling coil. Control valves, check valves, or both, are used to direct the flow of water, which are strategically placed in various water conduits.

20 Claims, 6 Drawing Sheets

(52) U.S. Cl.
CPC ....... *F25B 29/003* (2013.01); *F25B 2339/047* (2013.01); *Y02B 30/563* (2013.01); *Y02E 60/147* (2013.01)

(56) References Cited

U.S. PATENT DOCUMENTS

| | | | |
|---|---|---|---|
| RE26,391 E | 5/1968 | McFarlan | |
| 3,636,721 A | 1/1972 | Rex | |
| 3,791,160 A | 2/1974 | Savitz | |
| 3,995,443 A | 12/1976 | Iversen | |
| 4,165,619 A | 8/1979 | Girard | |
| 4,201,062 A | 5/1980 | Martinez | |
| 4,277,952 A | 7/1981 | Martinez | |
| 4,283,921 A | 8/1981 | Prosky | |
| 4,406,138 A | 9/1983 | Nelson | |
| 4,457,358 A | 7/1984 | Kriege | |
| 4,516,408 A | 5/1985 | Chiba | |
| 4,653,287 A | 3/1987 | Martin | |
| 4,679,411 A | 7/1987 | Pearse | |
| 4,766,735 A | 8/1988 | Gotou | |
| 4,878,357 A | 11/1989 | Sekigami | |
| 5,005,371 A | 4/1991 | Yonezawa | |
| 5,031,515 A | 7/1991 | Niemela | |
| 5,239,838 A | 8/1993 | Tressler | |
| 5,291,941 A | 3/1994 | Enomoto | |
| 5,573,058 A * | 11/1996 | Rolin | F24F 3/044 165/210 |
| 5,613,372 A | 3/1997 | Beal | |
| 5,622,057 A | 4/1997 | Bussjager | |
| 5,755,104 A | 5/1998 | Rafalovich | |
| 5,806,582 A * | 9/1998 | Santavuori | F24F 12/002 165/11.1 |
| 5,829,262 A | 11/1998 | Urata | |
| 6,237,351 B1 | 5/2001 | Itoh | |
| 6,539,736 B1 | 4/2003 | James | |
| 6,658,874 B1 | 12/2003 | Trent | |
| 6,701,731 B2 | 3/2004 | Aikawa | |
| 6,857,286 B2 | 2/2005 | Ohta | |
| 6,871,509 B2 | 3/2005 | Grabon | |
| 7,007,495 B2 | 3/2006 | Lee | |
| 7,293,425 B2 | 11/2007 | Tamura | |
| 7,797,954 B2 | 9/2010 | Duhme | |
| 9,915,453 B2 | 3/2018 | Moses | |
| 2006/0107683 A1 | 5/2006 | Song | |
| 2009/0134848 A1* | 5/2009 | Boisvert | F15B 7/008 322/38 |
| 2010/0050669 A1 | 3/2010 | Poux | |
| 2010/0070082 A1 | 3/2010 | Chessel | |
| 2010/0242532 A1* | 9/2010 | Kopko | F25B 25/005 62/498 |
| 2011/0000188 A1* | 1/2011 | Pegg | F01M 5/001 60/273 |
| 2012/0174602 A1* | 7/2012 | Olivier | B60H 1/004 62/79 |
| 2013/0199222 A1* | 8/2013 | Moses | F25B 41/00 62/115 |
| 2013/0199772 A1* | 8/2013 | Fischer | F28F 27/00 165/287 |
| 2014/0298834 A1* | 10/2014 | Gast, Jr. | F25B 25/00 62/119 |
| 2016/0076821 A1* | 3/2016 | Kopko | F25B 7/00 165/10 |

OTHER PUBLICATIONS

Flakt Woods, Econet Next Generation, 2015.
Flakt Woods, Econet Premium EQ, 2017.
Flakt Woods, Econet Exchanger, 2014.

* cited by examiner

AIR CONDITIONING SYSTEM AND METHOD WITH CHILLER AND WATER

RELATED PATENT APPLICATIONS

This patent application is a non-provisional patent application of, and claims priority to, U.S. Provisional Patent Application Ser. No. 62/445,060, filed on Jan. 11, 2016, and has the same title, inventor, and assignee. The contents of this priority patent application are incorporated herein by reference.

FIELD THE INVENTION

This invention relates to systems and methods for cooling spaces using one or more chillers and circulated water to transfer heat. Various embodiments relate to air conditioning or heating, ventilating, and air conditioning (HVAC) systems and components and equipment for such systems and to methods of configuring and controlling HVAC systems. Particular embodiments relate to systems and methods that circulate the same stream of water through both the evaporator and condenser of the chiller, at least in certain modes of operation.

BACKGROUND OF THE INVENTION

Heating, ventilating, and air-conditioning (HVAC) systems and methods have been used to maintain desirable temperatures and humidity levels within buildings and buildings have been constructed with ventilation systems, including HVAC systems, to provide comfortable and safe environments for occupants to live and work and for equipment to operate. Air conditioning systems and methods have been used, for example, to cool data centers, clean rooms, spaces that contain swimming pools, and many other types of spaces having particular needs for cooling, dehumidification, or both. Chillers have been used to chill water that has been circulated to air handlers and used to cool air within the space. Water has also been used to transfer waste heat from chillers to a heat sink, such as a heat exchanger to outside air, cooling tower, or ground heat sink, as examples.

Examples of the prior art are described in U.S. Pat. Nos. 4,769,053, 5,573,058, 5,806,582, and 6,199,388, and International Patent Application publication number WO 94/14011, all of which are incorporated herein by reference in their entirety. Certain terms, however, may be used differently in the documents that are incorporated by reference, and if any conflicts, errors, or ambiguity exist, this document shall govern herein.

Chillers that produce chilled water have been used as an efficient way to provide cooling and dehumidification, particularly for large buildings, but opportunities for improvement exist in the use of chillers and water systems, particularly under certain circumstances. Needs and opportunities for improvement exist, for example, for providing systems and methods that cool more efficiently under certain circumstances, that require few or smaller components, that provide other benefits, or a combination thereof. Room for improvement exists over the prior art in these and various other areas that may be apparent to a person of ordinary skill in the art having studied this document.

SUMMARY OF PARTICULAR EMBODIMENTS OF THE INVENTION

This invention provides, among other things, various air conditioning units, systems, and methods that control temperature and humidity, for instance, within a space in a building. Various units, methods, and systems, for example, include at least one chiller, at least one cooling coil, at least one heat sink, and particular water conduits that connect other components together in a specific configuration. Further, various methods and systems deliver water to particular components in a particular order and transfer heat in specific components. In many embodiments, where conduits are described as connecting to components, there are no other components in between that transfer heat. Further, in a number of embodiments, where water is described herein as being from a particular component, or being delivered to a particular component, there are no other components in between that transfer heat.

Various embodiments provide, for example, as an object or benefit, that they partially or fully address or satisfy one, or more of the needs, potential areas for benefit, or opportunities for improvement described herein, or known in the art, as examples. For instance, various embodiments provide systems and methods that cool more efficiently under certain circumstances, that require fewer or smaller components, that provide other benefits, or a combination thereof. Even further, some embodiments provide better cooling performance. Certain embodiments provide, for example, as objects or benefits, for instance, that they improve the performance of air conditioning systems and methods. Different embodiments simplify the design and installation of air conditioning systems, reduce the installed cost of the technology, increase energy efficiency, or a combination thereof, as examples. In addition, various other embodiments of the invention are also described herein, and other benefits of certain embodiments may be apparent to a person of ordinary skill in the art.

Specific embodiments include various air conditioning systems, for example, for cooling a space. In a number of embodiments, for example, such an air conditioning system includes a chiller, a cooling coil, a heat sink, various (e.g., four) water conduits, and a pump. For instance, various embodiments, include at least one chiller that includes an evaporator, a condenser, an evaporator inlet, and evaporator outlet, a condenser inlet, and a condenser outlet. Further, many embodiments include at least one cooling coil, for instance, that, cools air delivered to the space, at least one heat sink, for example, that rejects heat to an environment outside the space, or both. Still further, a number of embodiments include a first water conduit that connects the evaporator outlet to the cooling coil, a second water conduit that connects the cooling coil to the condenser inlet, a third water conduit that connects the condenser outlet to the at least one heat sink, a fourth water conduit that connects the at least one heat sink to the evaporator inlet, or a combination (e.g., all) thereof. Even further, various embodiments include at least one water pump, for example, that circulates water through the evaporator, the first water conduit, the cooling coil, the second water conduit, the condenser, the third water conduit, the at least one heat sink, and the fourth water conduit.

Further, some such embodiments include a fifth water conduit, for example, that connects the first water conduit to the second water conduit bypassing the cooling coil, at least one first water valve, for instance, that controls how much of the water passes through the fifth water conduit and that controls how much of the water passes through the cooling coil, a sixth water conduit, for example, that connects the third water conduit to the fourth water conduit bypassing the at least one heat sink, at least one second water valve, for instance, that controls how much of the water passes through the sixth water conduit and that controls how much of the water passes through the at least one heat sink, or a combination thereof.

Further still, some embodiments include a seventh water conduit, for example, that connects the second water conduit to the fourth water conduit. Still further, some embodiments include at least one third water valve, for instance, that controls whether the water passes through the seventh water conduit. Even further, certain embodiments include a first check valve, for example, located in the seventh water conduit. Even further still, some embodiments include an eighth water conduit, for example, that connects the fourth water conduit to the second water conduit. Moreover, certain embodiments include at least one fourth water valve that controls whether the water passes through the eighth water conduit. Further, particular embodiments include a second check valve, for example, located in the eighth water conduit. Furthermore, in various embodiments, the seventh water conduit connects to the second water conduit between the cooling coil and the eighth water conduit, the seventh water conduit connects to the fourth water conduit between the eighth water conduit and the evaporator inlet, or both. In addition, or instead, in some embodiments, the eighth water conduit connects to the second water conduit between the seventh water conduit and the condenser inlet, the eighth water conduit connects to the fourth water conduit between the at least one heat sink and the seventh water conduit, or both.

Even further, in some embodiments, the at least one water pump includes a first water pump, for example, located in the third water conduit, and a second water pump, for instance, located in the first water conduit. Further, in particular embodiments, the at least one water pump includes a first water pump and a second water pump, the first water pump is a first variable-speed pump, the second water pump is a second variable-speed pump, and the system controls speed of the first water pump and the second water pump to control water flow through the at least one cooling coil and through the at least one heat sink, for example, rather than bypassing water around the at least one cooling coil and bypassing water around the at least one heat sink.

Other specific embodiments include various methods, for example, of cooling a space. Examples of such a method include, in a first mode of operation, at least the acts of cooling water, delivering the water to a cooling coil, cooling supply air, delivering the supply air to the space, delivering the water to a chiller, rejecting heat from the chiller to the water, delivering the heated water to a heat sink, rejecting heat from the heated water, and delivering the water back to the chiller. In a number of embodiments, for example, the method includes cooling chilled water in at least one chiller, delivering at least a first portion of the chilled water from the at least one chiller to at least one cooling coil, and cooling supply air at the at least one cooling coil by transferring heat from the supply air to the at least the first portion of the chilled water with the at least one cooling coil. Further, various embodiments include delivering the supply air from the at least one cooling coil to the space, delivering the at least the first portion of the chilled water from the at least one cooling coil to the at least one chiller, and rejecting heat from the at least one chiller to the chilled water from the at least one cooling coil to form heated water. Still further, in a number of embodiments, the method includes delivering the heated water from the at least one chiller to at least one heat sink, rejecting heat from the heated water at the at least one heat sink to form the chilled water that is cooled in the at least one chiller, and delivering the chilled water from the at least one heat sink to the at least one chiller.

Further, in some such embodiments, the method includes, in a second mode of operation, cooling the chilled water in at least one chiller, delivering the chilled water from the at least one chiller to the at least one cooling coil, and cooling the supply air at the at least one cooling coil by transferring heat from the supply air to the chilled water with the at least one cooling coil. Still further, in various embodiments, in this second mode of operation, the method includes delivering the supply air from the at least one cooling coil to the space and delivering the chilled water from the at least one cooling coil to the at least one chiller. Further still, in a number of embodiments, in the second mode of operation, the cooling the chilled water in at least one chiller includes cooling the chilled water delivered from the at least one cooling coil to the at least, one chiller. Even further, in some embodiments, the method includes, in the second mode of operation, rejecting heat from the at least one chiller to heated water, delivering the heated water from the at least one chiller to at least one heat sink, rejecting heat from the heated water at the at least one heat sink, and delivering the heated water from the at least one heat sink to the at least one chiller. Further still, in various embodiments, in the second mode of operation, the rejecting of the heat from the at least one chiller to the heated water includes heating the heated water delivered from the at least one heat sink to the at least one chiller.

Still further, in some embodiments, the method includes operating a first water pump to circulate the chilled water, and operating a second water pump to circulate the heated water. Even further, in some embodiments, the method includes transitioning from the first mode of operation to the second mode of operation, for example, by operating at least one water control valve. Even further still, some embodiments include transitioning from the first mode of operation to the second mode of operation or transitioning from the second mode of operation to the first mode of operation by passing water through at least one check valve. Moreover, some embodiments include selecting between the first mode of operation and the second mode of operation based on outdoor ambient temperature.

Even further, in some embodiments, in a third mode of operation, the method includes, without operating the at least one chiller, cooling the chilled water in the at least one heat sink, delivering the chilled water from the at least one heat sink to the at least one cooling coil, and cooling the supply air at the at least one cooling coil by transferring heat from the supply air to the chilled water with the at least one cooling coil. Further, various embodiments include delivering the supply air from the at least one cooling coil to the space, and delivering the chilled water from the at least one cooling coil to the at least one heat sink. In a number of embodiments, in the third mode of operation, the cooling of the chilled water in the at least one heat sink includes cooling the chilled water delivered from the at least one cooling coil to the at least one heat sink.

The drawings illustrate, among other things, examples of certain aspects of particular embodiments. Various embodiments may include aspects shown in the drawings, described in the specification (including the claims), described in other materials that are incorporated by reference, known in the art, or a combination thereof, as examples. Other embodiments, however, may differ. Further, where the drawings show one or more components (e.g., multiple chillers) it should be understood that in other embodiments, there could be just one or multiple (e.g., any appropriate number) of such components.

DETAILED DESCRIPTION OF EXAMPLES OF EMBODIMENTS

Various embodiments include systems and methods for cooling spaces, for example, using one or more chillers and circulated water to transfer heat. Various embodiments include or provide air conditioning or heating, ventilating, and air conditioning (HVAC). Certain embodiments are or involve systems, components, equipment, methods, or a combination thereof, for example, of configuring and controlling HVAC systems. Particular embodiments involve systems or methods that circulate the same stream of water through both the evaporator (e.g., 540) and condenser (e.g., 550) of the chiller, at least in certain modes of operation. Different modes of operation are used under different (e.g., temperature) conditions and the water is routed differently in different modes. In a first mode, for example, the chiller rejects heat to water returning from the cooling coil, and in a second mode, there are separate loops of chilled and heated water with separate pumps for each loop. In a third (e.g., economizer) mode of operation, the chiller is off and water from the heat sink is delivered directly to the cooling coil, for example. Control valves, check valves, or both, are used to direct the flow of water, which, in various embodiments, are strategically placed in specifically-routed water conduits.

Many embodiments are or include an air conditioning system (e.g., 100, 200, 300, 400, or 500 shown in FIGS. 1-5), for example, for cooling a space (e.g., within a building). In a number of embodiments, for instance, the air conditioning system includes at least one chiller (e.g., 210 in FIGS. 2 and 3), at least one cooling coil (e.g., 120, 220, or 520 in various FIGS.), at least one heat sink (e.g., 130, 230, or 530), and certain water conduits that connect various components of the system in a specific configuration. In various embodiments, the at least one cooling coil (e.g., 120, 220, or 520) cools air that is delivered to the space. Further, in certain embodiments, the at least one cooling coil, or a portion, thereof, cools equipment (e.g., within the space) directly, for instance, one or more servers, for example, within a data center. Moreover, in many embodiments, the at least one heat sink (e.g., 130, 230, or 530) rejects heat to an environment outside the space. In certain embodiments, for example, the at least one heat sink (e.g., 130, 230, or 530) is or includes a heat exchanger, for example, that rejects heat to outside air. Further, in many embodiments, the at least one chiller (e.g., 210) includes an evaporator (e.g., 540), a condenser (e.g., 550), an evaporator inlet (e.g., 548), and evaporator outlet (e.g., 549), a condenser inlet (e.g., 558), and a condenser outlet (e.g., 559). Various embodiments are particularly beneficial in certain applications. In some embodiments, for example, the space is or includes a data center (e.g. 444 shown in FIG. 4). Further, in particular embodiments, the space is or includes a clean room. Still further, in certain embodiments, the space includes a swimming pool. Some embodiments, however, may be used for other applications.

Figure 5:
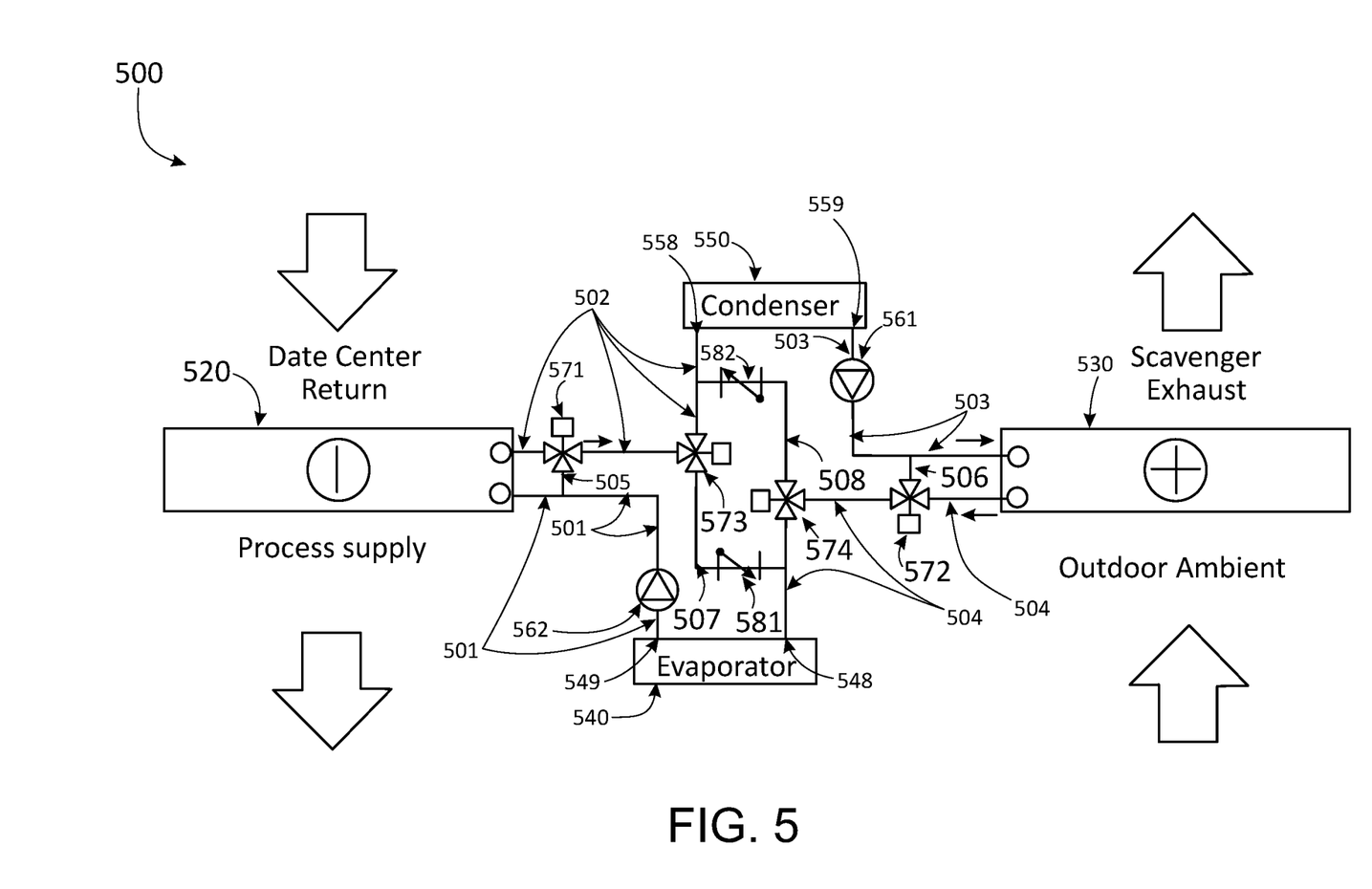
FIG. 5 is a schematic of an embodiment of water lines of an air conditioning system for cooling a space such as a data center.

Referring primarily to FIG. 5, for example, some embodiments include a first water conduit (e.g., 501) that connects the evaporator outlet (e.g., 549) to the cooling coil (e.g., 520). Further, some embodiments include a second water conduit (e.g., 502) that connects the cooling coil (e.g., 520) to the condenser inlet (e.g., 558). Still further, some embodiments include a third water conduit (e.g., 503) that connects the condenser outlet (e.g., 559) to the at least one heat sink (e.g., 530). Further still, some embodiments include a fourth water conduit (e.g., 504) that connects the at least one heat sink (e.g., 530) to the evaporator inlet (e.g., 548). Various embodiments further include at least one water pump (e.g., 561 and 562 shown) for example, that circulates water through the evaporator (e.g., 540), the first water conduit (e.g., 501), the cooling coil (e.g., 520), the second water conduit (e.g., 502), the condenser (e.g., 550), the third water conduit (e.g., 503), the at least one heat sink (e.g., 530), and the fourth water conduit (e.g., 504), for instance, in a loop.

In some embodiments, the air conditioning system (e.g., 500) further includes a fifth water conduit (e.g., 505), for example, that connects the first water conduit (e.g., 501) to the second water conduit (e.g., 502), for instance, bypassing the cooling coil (e.g., 520). Further, in some embodiments, the air conditioning system (e.g., 500) includes at least one first water valve (e.g., 571), for example, that controls how much of the water passes through the fifth water conduit (e.g., 505), that controls how much of the water passes through the cooling coil (e.g., 520), or both. Still further, in some embodiments, the at least one first water valve (e.g., 571) is or includes a (e.g., first) three-way valve, for example. In other embodiments, however, a two-way valve, or two two-way valves are used. Further still, in particular embodiments (e.g., as shown) the at least one first water valve (e.g., 571) is located in the second water conduit (e.g., 502).

Moreover, in some embodiments, the air conditioning system (e.g., 500) includes a sixth water conduit (e.g., 506), for instance, that connects the third water conduit (e.g., 503) to the fourth water conduit (e.g., 504), for example, bypassing the at least one heat sink (e.g., 530). Further, some embodiments include at least one second water valve (e.g., 572), for instance, that controls how much of the water passes through the sixth water conduit (e.g., 506), that controls how much of water passes through the at least one heat sink (e.g., 130, 230, or 530), or both. Furthermore, in certain embodiments, the at least one second water valve (e.g., 572) is or includes a (e.g., second) three-way valve. In other embodiments, multiple valves described herein are combined into one, or another number, of multi-functional valves (e.g., more than, three-way), as another example. Even further, in particular embodiments, the at least one second water valve (e.g., 572) is located in the fourth water conduit (e.g., 504).

Further, in some embodiments, the air conditioning system (e.g., 500) includes a seventh water conduit (e.g., 507), for example, that connects the second water conduit (e.g., 502) to the fourth water conduit (e.g., 504). Certain embodiments further include at least one third water valve (e.g., 573) that controls whether the water passes through the seventh water conduit (e.g., 507). In particular embodiments, for example, the at least one third water valve (e.g., 573) is or includes a (e.g., third) three-way valve. Still further, in some embodiments, the at least one third water valve (e.g., 573) is located in the second water conduit (e.g., 502), for instance, as shown. Further still, certain embodiments include a (e.g., first) check valve (e.g., 581), for example, located in the seventh water conduit (e.g., 507). In particular embodiments, for example, the first check valve (e.g., 581) is oriented to allow water to flow from the second water conduit (e.g., 502) to the fourth water conduit (e.g., 504) through the seventh water conduit (e.g., 507) but to block water from flowing from the fourth water conduit (e.g., 504) to the second water conduit (e.g., 502) through the seventh water conduit (e.g., 507).

In some embodiments, the air conditioning system (e.g., 500) includes an eighth water conduit (e.g., 508) that connects the fourth water conduit (e.g., 504) to the second water conduit (e.g., 502). Further, in particular embodiments, the air conditioning system (e.g., 500) includes at least one fourth water valve (e.g., 574), for example, that controls whether the water passes through the eighth water conduit (e.g., 508). In certain embodiments, for instance, the at least one fourth water valve (e.g., 574) is or includes a (e.g., fourth) three-way valve. Still further, in particular embodiments, the at least one fourth water valve (e.g., 574) is located in the fourth water conduit (e.g., 504), for instance, as shown. Even further, some embodiments include a second check valve (e.g., 582), for instance, located in the eighth water conduit (e.g., 508). In particular embodiments, for example, the second check valve (e.g., 582) is oriented to allow water to flow from the fourth water conduit (e.g., 504) to the second water conduit (e.g., 502) through the eighth water conduit (e.g., 508) but to block water from flowing from the second water conduit (e.g., 502) to the fourth water conduit (e.g., 504) through the eighth water conduit (e.g., 508).

In a number of embodiments, the at least one water pump previously mentioned includes a first water pump (e.g., 561) and a second water pump (e.g., 562). In some embodiments, for example, the first water pump (e.g., 561) is located in the third water conduit (e.g., 503). Further, in particular embodiments, the second water pump (e.g., 562) is located in the first water conduit (e.g., 501). Still further, in some embodiments, the seventh water conduit (e.g., 507) connects to the second water conduit (e.g., 502) between the cooling coil (e.g., 520) and the eighth water conduit (e.g., 508). Even further, in some embodiments, the seventh water conduit (e.g., 507) connects to the fourth water conduit (e.g., 504) between the eighth water conduit (e.g., 508) and the evaporator (e.g., 540) or evaporator inlet (e.g., 548). Further still, in particular embodiments, the eighth water conduit (e.g., 508) connects to the second water conduit (e.g., 502) between the seventh water conduit (e.g., 507) and the condenser (e.g., 550) or condenser inlet (e.g., 558). Even further still, in certain embodiments, the eighth water conduit (e.g., 508) connects to the fourth water conduit (e.g., 504) between the at least one heat sink (e.g., 530) and the seventh water conduit (e.g., 507).

In certain embodiments, the at least one water pump, the first water pump (e.g., 561) the second water pump (e.g., 562), or a combination thereof, are variable-speed pumps, for example, driven by one or more variable-speed drives, variable-frequency (e.g., AC) drives, or variable-voltage (e.g., DC) power supplies, as examples. Further, in particular embodiments, use of one or more variable-speed pumps (e.g., 561, 562, or both), can eliminate the need for the fifth water conduit (e.g., 505), the sixth water conduit (e.g., 506) the (e.g., at least one) first water valve (e.g., 571), the (e.g., at least one) second water valve (e.g., 572), or a combination thereof. For example, in certain embodiments, the first water pump (e.g., 561) and the second water pump (e.g., 562) are variable-speed pumps (e.g., with electronically commutated motors) and the fifth water conduit (e.g., 505), the sixth water conduit (e.g., 506) the first water valve (e.g., 571), and the second water valve (e.g., 572), are all omitted. In such embodiments, a controller (e.g., a digital controller) controls the speed of the first water pump (e.g., 561) and the second water pump (e.g., 562), for instance, rather than modulating the first water valve (e.g., 571), and the second water valve (e.g., 572) to control temperature of supply air delivered to the space, space temperature (e.g., relative to a thermostat setpoint temperature), water temperature, heat rejected, for instance, the at least one heat sink (e.g., 130, 230, or 530), or a combination thereof. Further, in some embodiments, one or more fans (e.g., 102, 103, or both) are variable-speed fans, the speed of which are varied (e.g., by the controller), for example, to control temperature, dew point (e.g., of air delivered to the space), humidity, heat rejected, pressure, air volume, or the like.

In particular embodiments, for example, the at least one water pump includes a first water pump (e.g., 561) and a second water pump (e.g., 562), and the first water pump is a first variable-speed pump and the second water pump is a second variable-speed pump. Further, in a number of embodiments, the system (e.g., 500) controls speed of the first water pump (e.g., 561) and the second water pump (e.g., 562), for instance, to control water flow through the at least one cooling coil (e.g., 520) and through the at least one heat sink (e.g., 530). Still further, in various embodiments, this speed control is done, for example, rather than bypassing (e.g., through fifth water conduit 505) water around the at least one cooling coil (e.g., 520) and bypassing (e.g., through sixth water conduit 506) water around the at least one heat sink (e.g., 530).

As used herein, a "water conduit" does not contain within it a heat exchanger. As used herein, however, a "water conduit" may contain one or more tees, pumps, or valves. As shown in FIG. 5, for example, first water conduit 501 contains second water pump 562 and a tee with water conduit 505, second water conduit 502 contains valves 571 and 573 and a tee with water conduit 508, third water conduit 503 contains first water pump 561 and a tee with water conduit 506, and fourth water conduit 504 contains valves 572 and 574 and a tee with water conduit 507. Further, as used herein, a "water conduit" identified (e.g., by number, such as first, second, etc.) herein does not contain within it any other water conduit identified herein. In other words, as used herein, water conduits do not overlap, although they may touch (e.g., with a tee). Further still, as used herein, "connects" means directly connects with no heat exchanger or other named conduit in between. Again, there may be one or more valves, pumps, or tees in between. For example, in FIG. 5, seventh water conduit 507 connects second water conduit 502 to fourth water conduit 504 despite valves 573, 574, and 581. But, as used herein, second water conduit 502 does not "connect" to fourth water conduit 504 because seventh water conduit 507 is a separate conduit and second water conduit 502 does not reach fourth water conduit 504 with only a valve, pump, or tee in between. Further, as used herein, a water conduit is linear, although not necessarily straight, and does not have branches.

Additionally, in certain embodiments, the air conditioning system (e.g., 100, 200, 400, 500, or 500) includes an evaporative cooler (e.g., 150 shown in FIG. 1), for example, that cools air delivered to the at least one heat sink (e.g., 130, 230, or 530). Further, in some embodiments, the air conditioning system (e.g., 100, 200, 400, 500, or 500) includes a desiccant wheel, for example, that dehumidifies the air that is delivered to the space. Further still, in particular embodiments, the desiccant wheel is regenerated with exhaust air from the at least one heat sink (e.g., 130, 230, or 530). Even further, certain embodiments include no heat exchanger other than the evaporator (e.g., 540), the condenser (e.g., 550), the at least one cooling coil (e.g., 520), for instance, that, cools air delivered to the space, and the at least one heat sink (e.g., 530), for example, that rejects heat to the environment outside the space.

Figure 1:
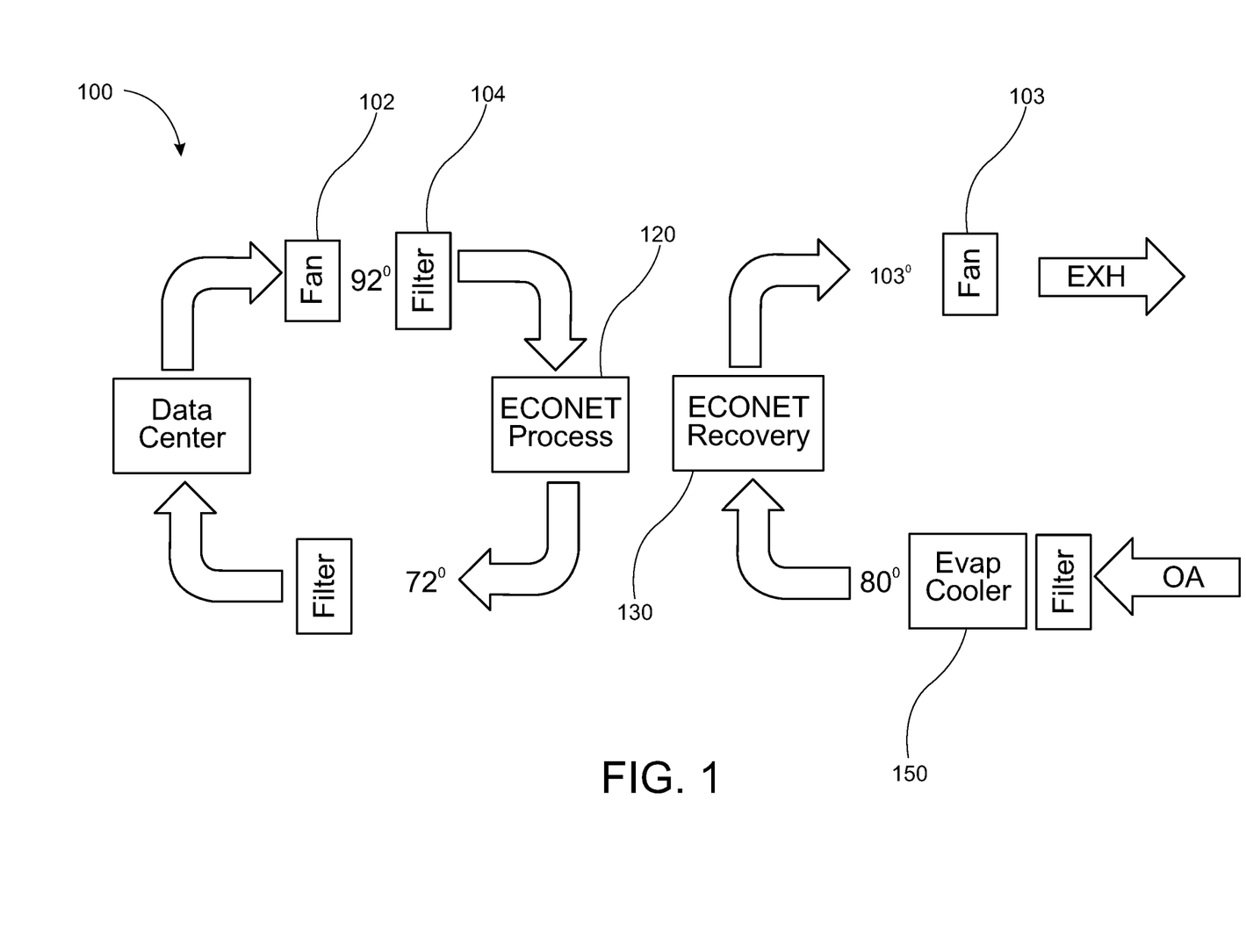
FIG. 1 is a block diagram illustrating an air path of various embodiments of an air conditioning system for cooling a space such as a data center.
Figure 4:
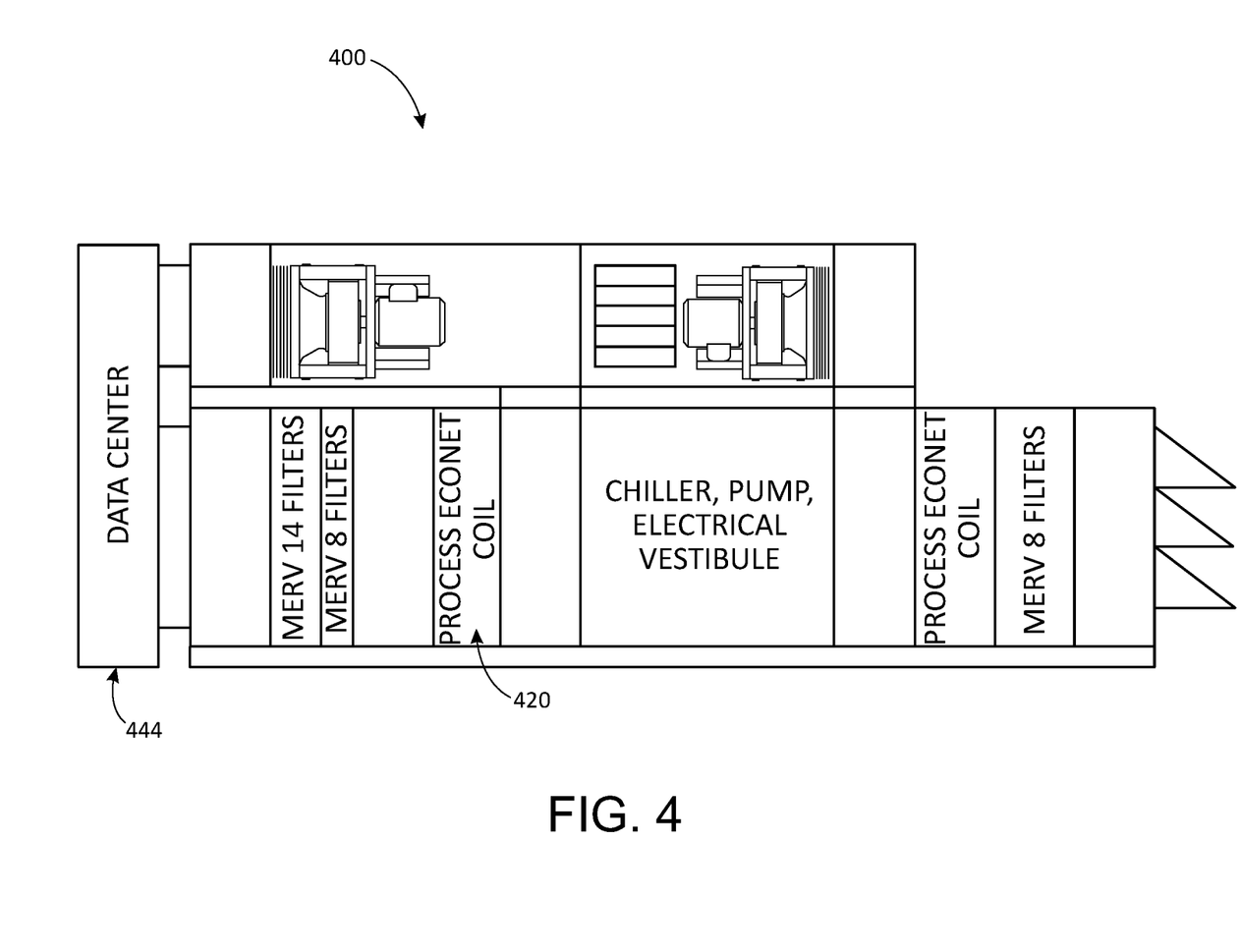
FIG. 4 is a block diagram illustrating an example of a layout of an air conditioning unit or system for cooling a space such as a data center.

In various embodiments, the air conditioning system (e.g., 100) includes at least one supply fan (e.g., 102), for example, that moves air from the space through the at least one cooling coil (e.g., 120) and back to the space. Further, in many embodiments, the air conditioning system (e.g., 100) includes at least one outdoor air fan (e.g., 103) that moves air from the environment through the at least one heat sink (e.g., 130) and back to the environment. Still further, in a number of embodiments, the at least one chiller (e.g., 210) includes at least one compressor. Even further, in many embodiments, the at least one chiller (e.g., 210) includes at least one expansion valve. Further still, in a number of embodiments, the air conditioning system (e.g., 500) includes at least one filter (e.g., 104), for instance, that filters air delivered to the at least one cooling coil (e.g., 120). Various filters are shown in FIGS. 1 and 4, for example.

Figure 6:
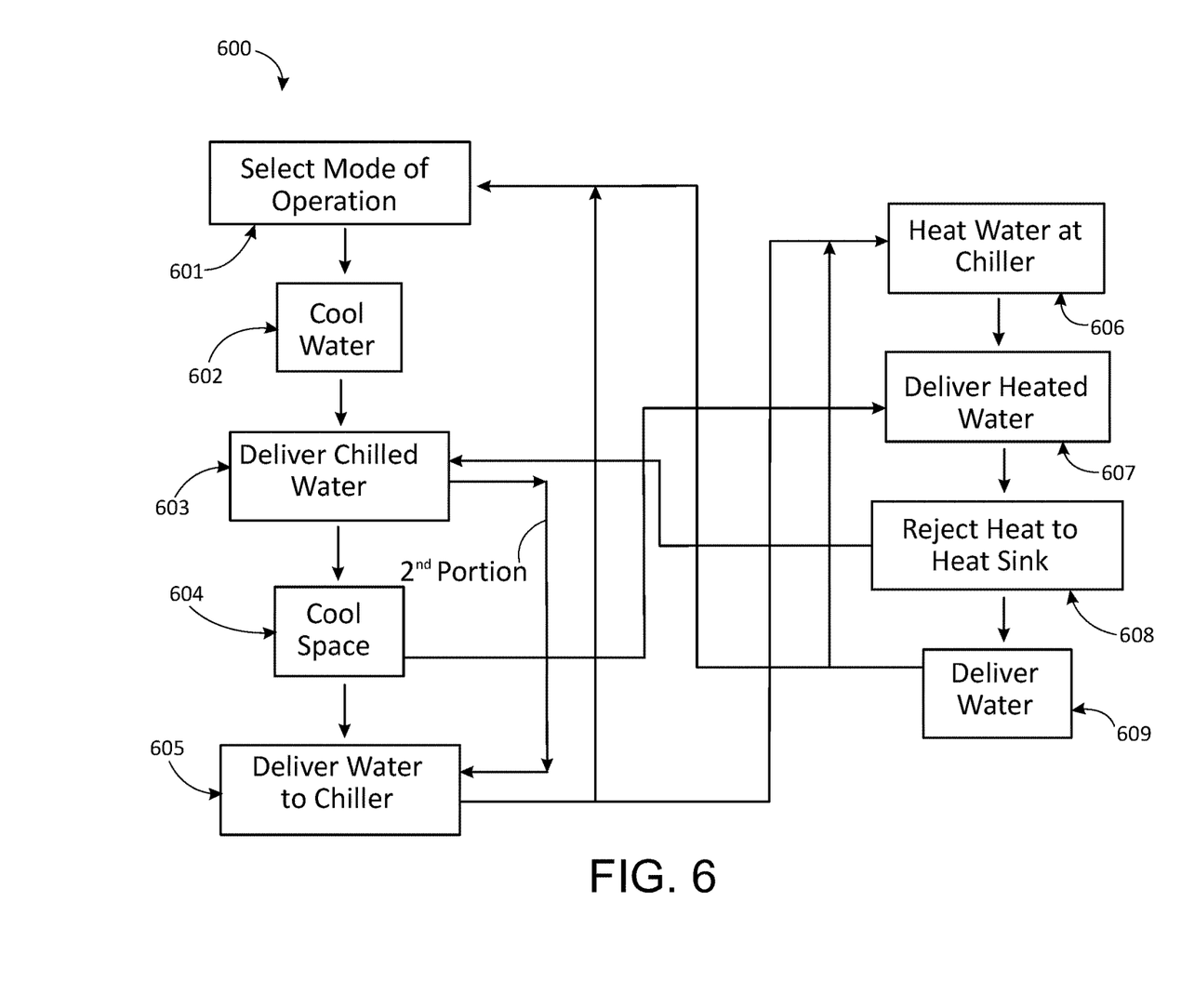
FIG. 6 is a flow chart illustrating an example of a method of cooling a space, for instance, a data center.

Some embodiments are or include various methods, for example, of cooling a space. As used herein, "cooling a space" includes cooling equipment located within a space, for example, servers located within a data center (e.g., 444). In some embodiments, air within the space is cooled. Further, in particular embodiments, equipment is cooled directly, for example, with chilled water. Still further, in various embodiments, methods include certain steps or acts. In different embodiments, for example, the acts can be performed in the order described, in a different feasible order, at the same time, continuously (e.g., for a period of time), alternating, or a combination thereof, as examples. As used herein, acts may be performed in any order unless indicated otherwise. In some embodiments, for instance, equipment is operated in one or more modes of operation, for example, depending on conditions. FIG. 6 is a flow chart that illustrates various methods and modes of operation, for example.

In some embodiments, for example, a method (e.g., 600) includes, in a first mode of operation, at least certain acts. Such acts may include, for example, cooling chilled water (e.g., act 602), for example, in at least one chiller (e.g., 210 shown in FIGS. 2 and 3). In this context, the water is being referred to as "chilled" water. Further, various embodiments include delivering (e.g., in act 603) at least a first portion of the chilled water, for instance, from the at least one chiller (e.g., 210), for example, to at least one cooling coil (e.g., 120, 220, or 520). Still further, some embodiments include cooling a space (e.g., act 604), for example, cooling supply air at the at least one cooling coil (e.g., 120, 220, or 520), for instance, by transferring heat from the supply air to the at least the first portion of the chilled water with the at least one cooling coil (e.g., 120, 220, or 520). Further still, some methods include (e.g., in act 604) delivering the supply air, for example, from the at least one cooling coil (e.g., 120, 220, or 520) to the space (e.g., data center 444). Even further, some embodiments include delivering water to the chiller (e.g., 605), for example, delivering the at least the first portion of the chilled water from the at least one cooling coil (e.g., 120, 220, or 520) to the at least one chiller (e.g., 210), for instance, in the first mode of operation. In this context, as used herein, the water is still being referred to as "chilled" water, even though it was partially heated by the supply air (e.g., in act 604).

Even further still, various embodiments include heating the water at the chiller (e.g., act 606), for example, rejecting heat from the at least one chiller (e.g., 210) to the chilled water from the at least one cooling coil (e.g., 120, 220, or 520, for example, from act 604), for instance, forming heated water (i.e., as used herein). Moreover, some embodiments include delivering the heated water (e.g., in act 607), for example, from the at least one chiller (e.g., 210) to at least one heat sink (e.g., 130, 230, or 530). Furthermore, a number of embodiments include rejecting heat (e.g., in act 608), for instance, from the heated water, at the at least one heat sink (e.g., 130, 230, or 530), or both. In some embodiments (or modes of operation) this forms the chilled water (i.e., as used herein) that is cooled in the at least one chiller (e.g., 210), for instance, in act 602. Additionally, some embodiments include delivering the (e.g., chilled) water (e.g., in act 609), for instance, from the at least one heat sink (e.g., 130, 230, or 530) to the at least one chiller (e.g., 210). Further, as used herein, "delivering" water from a first location to a second location, means delivering directly with no heat exchanger in between. As used herein, "delivering" water from a first location to a second location, however, may include delivering the water through one or more valves, one or more tees, one or more pumps, or a combination thereof.

In particular embodiments, the act (e.g., 602) of cooling the chilled water, for example, in the at least one chiller (e.g., 210) includes cooling (e.g., chilled) water that is delivered (e.g., in act 609) from the (e.g., at least one) heat sink (e.g., 130, 230, or 530). Further, some embodiments include delivering (e.g., in act 603) a second portion of the chilled water from the at least one chiller (e.g., 210) to (i.e., back to) the at least one chiller (e.g., 210). In certain embodiments, for example, the cooling of the (e.g., chilled) water (e.g., in act 602), for instance, in at least one chiller (e.g., 210) includes cooling (e.g., the at least) the first portion of the chilled water and cooling the second portion of the chilled water. Still further, in particular embodiments, the second portion of the chilled water is separated from the at least the first portion of the chilled water (e.g., in act 603), for instance, immediately downstream of the cooling of the chilled water (e.g., in act 602), for example, in at least one chiller (e.g., 210). As used herein, "immediately" (e.g., downstream) means without any intervening heat exchanger. In various embodiments, the second portion of the chilled water is not delivered to the at least one cooling coil (e.g., 120, 220, or 520), for example, bypassing act 604. Even further, in a number of embodiments, heat from the supply air, for example, is not transferred to the second portion of the chilled water with the at least one cooling coil (e.g., 120, 220, or 520), for instance, in act 604. Even further still, in some embodiments, the second portion of the chilled water is mixed (e.g., in act 605 or immediately upstream of act 605) with the at least the first portion of the chilled water, for example, immediately downstream of where the at least the first portion of the chilled water leaves the at least one cooling coil (e.g., 120, 220, or 520), for instance, where act 604 takes place. Further still, in some embodiments, the second portion of the chilled water is mixed with the first portion of the chilled water upstream of where the first portion of the chilled water is delivered from the at least one cooling coil (e.g., 120, 220, or 520) to the at least one chiller (e.g., 210), for example, in act 605. Moreover, in some embodiments, the second portion of the chilled water is mixed with the at least the first portion of the chilled water upstream of where heat from the at least one chiller (e.g., 210) is rejected to the (e.g., chilled) water to form heated water, in act 606.

Various embodiments include separating (e.g., in act 603) the chilled water, for example, that was cooled (e.g., in, act 602) for instance, in the at least one chiller (e.g., 210), into the first portion of the chilled water and the second portion of the chilled water. Further, in some embodiments, the separating (e.g., in act 603) of the chilled water (e.g., that was cooled in the at least one chiller, e.g., 210, in act 602, or both) into the first portion of the chilled water and the second portion of the chilled water is accomplished using at least one first water valve (e.g., 571), for instance, that controls how much of the chilled water passes through the cooling coil (e.g., 520), for instance, in act 604. Still further, in some embodiments, the at least one first water valve (e.g., 571) is located immediately upstream of where (e.g., in act 606) the heat from the at least one chiller (e.g., 210) is rejected to the chilled water to form the heated water. Even further, in some embodiments, the at least one first water valve (e.g., 571) is located immediately downstream of the at least one cooling coil (e.g., 520). Further still, in some embodiments, the separating (e.g., in act 603) of the chilled water that was cooled (e.g., in act 602), for instance, in the at least one chiller (e.g., 210) into the first portion of the chilled water and the second portion of the chilled water includes controlling a first three-way valve (e.g., 571).

In numerous embodiments, for example, of method 600, the at least one heat sink (e.g., 130, 230, or 530) includes a heat exchanger, for example, that rejects the heat to outside air (e.g., in act 608). Further, in many embodiments, the act (e.g., 608) of rejecting heat (e.g., from the heated water) at the at least one heat sink (e.g., 130, 230, or 530) includes transferring heat from the heated water to the outside air with the heat exchanger. Still further, in some embodiments, the method (e.g., 600) includes (e.g., in act 607) bypassing a third portion of the (e.g., heated) water around the at least one heat sink (e.g., 130, 230, or 530). For example, some embodiments include (e.g., in act 607) controlling at least one second water valve (e.g., 572), for instance, that controls how much of the heated water passes through the at least one heat sink (e.g., 130, 230, or 530). Further still, particular embodiments include controlling a second three-way valve (e.g., 572), for example, that controls the heated water. Even further, in certain embodiments, the at least one second water valve (e.g., 572) or the second three-way valve is located immediately downstream of where (e.g., in act 606) the heat from the at least one chiller (e.g., 210) is rejected to the chilled water to form the heated water. Even further still, in particular embodiments, the at least one second water valve (e.g., 572) or the second three-way valve is located immediately downstream of the heat sink (e.g., of act 608). See, for example, FIG. 5.

In some embodiments, the method (e.g., 600) further includes, in a second mode of operation (e.g., selected in act 601, for example, based on conditions) cooling (e.g., in act 602) the chilled water, for example, in at least one chiller (e.g., 210), delivering the chilled water (e.g., in act 603), for instance, from the at least one chiller (e.g., 210) to the at least one cooling coil (e.g., 120, 220, or 520), and cooling (e.g., in act 604), for example, the supply air, for instance, at the at least one cooling coil (e.g., 120, 220, or 520), for example, by transferring heat from the supply air to the chilled water with the at least one cooling coil (e.g., 120, 220, or 520). Further, in some embodiments, in the second mode of operation, the method (e.g., 600) includes (e.g., in act 604) delivering the supply air from the at least one cooling coil (e.g., 120, 220, or 520) to the space, and delivering (e.g., in act 605) the chilled water from the at least one cooling coil (e.g., 120, 220, or 520) to the at least one chiller (e.g., 210). In some embodiments, however, in the second mode of operation (e.g., in contrast to the first mode of operation), the cooling (e.g., in act 602) of the chilled water in at least one chiller (e.g., 210) includes cooling (e.g., as opposed to heating or rejecting heat to) the (e.g., chilled) water delivered (e.g., in act 605) from the at least one cooling coil (e.g., 120, 220, or 520) to the at least one chiller (e.g., 210).

Further, in some embodiments, the method (e.g., 600) further includes, in the second mode of operation, rejecting heat (e.g., in act 606) from the at least one chiller (e.g., 210) to heated water, delivering (e.g., in act 607) the heated water from the at least one chiller (e.g., 210) to the at least one heat sink (e.g., 130, 230, or 530), rejecting heat (e.g., in act 608) from the heated water at the at least one heat sink (e.g., 130, 230, or 530), and delivering (e.g., in act 609) the heated water from the at least one heat sink (e.g., 130, 230, or 530) to (i.e., back to) the at least one chiller (e.g., 210), for example, for act 609. In various embodiments (e.g., contrast with the first mode of operation), in the second mode of operation, the rejecting (e.g., in act 606) of the heat from the at least one chiller (e.g., 210) to the heated water includes heating (e.g., as opposed to cooling) the heated water delivered (e.g., in act 609) from the at least one heat sink (e.g., 130, 230, or 530) to the at least one chiller (e.g., 210). Numerous embodiments include a second mode of operation wherein the chilled water is not converted to the heated water and the heated water is not converted to the chilled water. Still further, various embodiments, include a second mode of operation wherein there is a first loop (e.g., the left column in FIG. 6) for the chilled water and a second loop (e.g., the right column in FIG. 6) for the heated water and the second loop is separate from the first loop.

In a number of embodiments, the method (e.g., 600) includes a second mode of operation and further includes transitioning (e.g., in act 601) from the first mode of operation to the second mode of operation, for example, by operating at least one water control valve. In this context, as used herein, "operating" a valve means changing the position of a valve, for example, opening or closing a valve, for instance, an automatically operated valve, for example, under the control of a (e.g., digital) controller. Further, in some embodiments, the method (e.g., 600) includes transitioning (e.g., in act 601) from the first mode of operation to the second mode of operation by operating multiple water control valves. In particular embodiments, for example, two water control valves are operated. Further still, in some embodiments, the method (e.g., 600) includes a second mode of operation and further includes transitioning (e.g., in act 601) from the second mode of operation to the first mode of operation, for example, by operating at least one water control valve. Even further, some embodiments include transitioning (e.g., in act 601) from the second mode of operation to the first mode of operation by operating multiple water control valves. In particular embodiments, for example, two water control valves are operated. Other embodiments may have more water control valves, for example, four water control valves.

Further, some embodiments include transitioning from the first mode of operation to the second mode of operation, or transitioning (e.g., in act 601) from the second mode of operation to the first mode of operation by passing water through at least one check valve (e.g., 581, 582, or both). Even further, some embodiments include transitioning from the first mode of operation to the second mode of operation or transitioning (e.g., in act 601) from the second mode of operation to the first mode of operation by passing water through multiple check valves (e.g., 581 and 582). Further still, in some embodiments, the method (e.g., 600) includes a second mode of operation and further includes transitioning (e.g., in act 601) from the first mode of operation to the second mode of operation or transitioning (e.g., in act 601) from the second mode of operation to the first mode of operation by passing water through two check valves (e.g., 581 and 582).

Referring to FIG. 5, in particular embodiments, in the first mode of operation, the third water valve 573 is positioned so that all of the water coming from the at least one cooling coil 520 is directed to condenser 550 and the fourth water valve 574 is positioned so, that all of the water coming from the heat sink 530 is directed to evaporator 540. In contrast, in the second mode of operation, the third water valve 573 is positioned so that all of the water coming from the at least one cooling coil 520 is directed to evaporator 540 and the fourth water valve 574 is positioned so that all of the water coming from the heat sink 530 is directed to condenser 550. Thus, the system changes (e.g., in act 601) from the first mode of operation to the second mode of operation, and vice versa, by fully changing the third water valve 573 and the fourth water valve 574.

In particular embodiments, the method (e.g., 600) includes, in a third mode of operation, for example, without operating the at least one chiller (e.g., 210), cooling the (e.g., chilled) water in the at least one heat sink (e.g., 130, 230, or 530), for instance, in act 608, delivering (e.g., in act 609, 603, or both) the (e.g., chilled) water from the at least one heat sink (e.g., 130, 230, or 530) to the at least one cooling coil (e.g., 120, 220, or 520), cooling (e.g., in act 604) the space or the supply air at the at least one cooling coil (e.g., 120, 220, or 520), for example, by transferring heat from the supply air to the chilled water with the at least one cooling coil (e.g., 120, 220, or 520), delivering (e.g., in act 604) the supply air, for instance, from the at least one cooling coil (e.g., 120, 220, or 520), to the space, and delivering (e.g., in act 607) the (e.g., chilled) water from the at least one cooling coil (e.g., 120, 220, or 520) to the at least one heat sink (e.g., 130, 230, or 530, for instance, for heat rejection again in act 608). In this context, as used herein, "without operating the at least one chiller" means that no chiller compressor is running within the air conditioning system. Operation of the at least one chiller may be, for instance, under the control of a (e.g., digital) controller. In some embodiments, water still passes through the chiller in the third mode of operation, but in other embodiments, the water bypasses the chiller, for instance, by operating one or more water valves. In a number of embodiments, in the third mode of operation, the cooling (e.g., in act 608) of the (e.g., chilled) water in the at least one heat sink (e.g., 130, 230, or 530) includes (e.g., immediately) cooling the (e.g., chilled) water delivered (e.g., in act 607) from the at least one cooling coil (e.g., 120, 220, or 520) at the at least one heat sink (e.g., 130, 230, or 530). In various embodiments, in the third mode of operation, the chilled water (i.e., that is used in acts 604 and 608) is not passed through the at least one chiller (e.g., 210) or is not cooled, heated, or both, at the at least one chiller (e.g., 210).

In various embodiments, the method (e.g., 600) that includes a third mode of operation includes transitioning (e.g., in act 601) from the first mode of operation to the third mode of operation by operating at least one water control valve (e.g., 573, 574, or both). Some embodiments include transitioning (e.g., in act 601) from the first mode of operation to the third mode of operation by operating multiple water control valves for example, by operating two water control valves (e.g., 573 and 574). Other embodiments may include transitioning from the first mode of operation to the third mode of operation by operating four water control valves, as another example. Further, some embodiments of a method (e.g., 600) include transitioning from the third mode of operation to the first mode of operation by operating at least one water control valve (e.g., 573, 574, or both) or by operating multiple water control valves (e.g., 573 and 574), by passing water through at least one check valve (e.g., 581 or 582), by passing water through multiple check valves (e.g., 581 and 582), by passing water through two check valves (e.g., 581 and 582), or a combination thereof, as examples. In other embodiments, however, the method (e.g., 600) includes transitioning (e.g., in act 601) from the first mode of operation to the third mode of operation by turning off the at least one chiller (e.g., 210), for instance, by deenergizing all compressors of the at least one chiller (e.g., 210). Even further, in some embodiments, a portion of the at least one chiller (e.g., 210) or compressors of the at least one chiller (e.g., 210) are deenergized (or slowed) in a mode of operation that is between the first mode and the third mode (e.g., when conditions warrant such operation).

Still further, in some embodiments, the method (e.g., 600) includes transitioning from the second mode of operation to the third mode of operation by operating at least one water control valve, by operating multiple water control valves, by operating four water control valves, or a combination thereof. Even further, in some embodiments, the method (e.g., 600) includes transitioning from the third mode of operation to the second mode of operation by operating at least one water control valve, by operating multiple water control valves, by operating four water control valves, by passing water through at least one check valve, by passing water through multiple check valves, by passing water through two check valves, or a combination thereof. In some embodiments, for example, this act of transitioning may be similar to act 601. Act 601 is shown first in FIG. 6 to illustrate that, in many embodiments, the mode of operation is selected initially in the method (e.g., 600). In a number of embodiments, however, the mode of operation is continuously or periodically reevaluated, for example, during each mode of operation. Even further still, in various methods having one or more water control valves, for example, at least one of the water control valves is a 3-way valve, multiple of the water control valves are 3-way valves, or all of the water control valves are 3-way valves, as examples.

In a number of embodiments, the method (e.g., 600) includes (e.g., in act 601) selecting between the first mode of operation and the second mode of operation, for example, based on outdoor ambient temperature. As used herein, in this context, "based on" means that the outdoor ambient temperature is used for determining the mode of operation, but other conditions may also be taken into consideration in that determination. In some embodiments, for example, the second mode of operation is selected over the first mode of operation when the outdoor ambient temperature is above a first threshold temperature. Further, in some embodiments, first mode of operation is selected over the second mode of operation when the outdoor ambient temperature is below a second threshold temperature. In other embodiments, however, the second mode of operation is selected over the first mode of operation when the outdoor ambient temperature is below a first threshold temperature. Further, in some embodiments, first mode of operation is selected over the second mode of operation when the outdoor ambient temperature is above a second threshold temperature.

Still further, in particular embodiments, the first threshold temperature is equal to the second threshold temperature. In other embodiments, however, some dead band or difference may exist between the first threshold temperature and the second threshold temperature, for instance, to reduce the frequency of changes between the different modes of operation. The same may be true for selection between other modes of operation in some embodiments. Even further, in some embodiments, a change in mode of operation may be prevented until a predetermined amount of time has passed since the previous change in mode of operation. Similarly, in a number of embodiments, the method (e.g., 600) includes selecting (e.g., in act 601 or a similar act) between the first mode of operation and the third mode of operation based on outdoor ambient temperature, as another example. In some embodiments, for instance, the third mode of operation is selected over the first mode of operation when the outdoor ambient temperature is below a third threshold temperature. Further, in some embodiments, the first mode of operation is selected over the third mode of operation when the outdoor ambient temperature is above a fourth threshold temperature. Further still, in certain embodiments, the third threshold temperature is equal to the fourth threshold temperature.

Even further, in some embodiments, the method (e.g., 600) includes selecting between the first mode of operation and the second mode of operation, for example, based on space temperature. In some embodiments, for example, the second mode of operation is selected over the first mode of operation when the space temperature is higher. Moreover, in some embodiments, the first mode of operation is selected over the second mode of operation when the space temperature is lower. In other embodiments, however, the second mode of operation is selected over the first mode of operation when the space temperature is lower. Moreover, in some embodiments, the first mode of operation is selected over the second mode of operation when the space temperature is higher. Furthermore, in some embodiments, the method (e.g., 600) includes selecting between the first mode of operation and the third mode of operation based on space temperature. Further, in particular embodiments, for example, the third mode of operation is selected over the first mode of operation when the space temperature is lower, the first mode of operation is selected over the third mode of operation when the space temperature is higher, or both. Still further, in certain embodiments, the space temperature is relative to a thermostat set point temperature.

In many embodiments, the method (e.g., 600) includes (e.g., in act 603, 605, 607, 609, or a combination thereof) operating a first water pump (e.g., 561) to circulate the (e.g., chilled) water. Further, in some embodiments having the second mode of operation, the method (e.g., 600) includes operating a second water pump (e.g., 562) to circulate the (e.g., heated) water, at least in the second mode of operation (e.g., in act 607, 609, or both). In certain embodiments, the at least one water pump, the first water pump (e.g., 561) the second water pump (e.g., 562), or a combination thereof, are variable-speed pumps, for example, controlled (e.g., in act 603, 607, or both) by a controller (e.g., a digital controller) that controls the speed of the first water pump (e.g., 561) the second water pump (e.g., 562), or both. In some embodiments, for instance, pump speed is varied, for instance, rather than modulating the first water valve (e.g., 571), the second water valve (e.g., 572), or both, for example, to control temperature of supply air delivered to the space, space temperature (e.g., relative to a thermostat setpoint temperature), water temperature, heat, rejected, for instance, the at least one heat sink (e.g., 130, 230, or 530), or a combination thereof. Further, in particular embodiments, use of one or more variable-speed pumps (e.g., 561, 562, or both), can eliminate the need for the fifth water conduit (e.g., 505), the sixth water conduit (e.g., 506) the (e.g., at least one) first water valve (e.g., 571), the (e.g., at least one) second water valve (e.g., 572), or a combination (e.g., all) thereof. Still further, in embodiments where the fifth water conduit (e.g., 505) and first water valve (e.g., 571) are eliminated, the first portion of the chilled water, described herein, may be all of the chilled water. Even further, in some embodiments, one or more fans (e.g., 102, 103, or both) are variable-speed fans, the speed of which are varied (e.g., by the controller, for instance, in act 604, 608, or both), for example, to control temperature, dew point (e.g., of air delivered to the space), heat rejected, or the like. In a number of embodiments, fan energy or fan power can also be controlled.

In some embodiments, the space includes a data center (e.g. 444) and the method (e.g., 600) includes cooling (e.g., in act 604) the data center (e.g. 444). Further, in some embodiments, the space includes a clean room and the method (e.g., 600) includes cooling the clean room (e.g., in act 604). Still further, in particular embodiments, the space includes a swimming pool and the method (e.g., 600) includes (e.g., in act 604) cooling, dehumidifying, or both, the space that contains the swimming pool. Further still, in some embodiments, the method (e.g., 600) includes cooling or precooling (e.g., in act 608) outside air delivered to the at least one heat sink (e.g., 130, 230, or 530). Even further, in some embodiments the method (e.g., 600) includes (e.g., in act 608) operating an evaporative cooler, for example, that cools air delivered to the at least one heat sink (e.g., 130, 230, or 530). Even further still, in certain embodiments, the method (e.g., 600) includes (e.g., in act 604) dehumidifying the supply air that is air delivered to the space. Moreover, in particular embodiments, the method (e.g., 600) includes operating a desiccant wheel, for example, that dehumidifies the supply air (e.g., in act 604). Furthermore, in certain embodiments, the method includes regenerating the desiccant wheel, for example, with exhaust air from the at least one heat sink (e.g., 130, 230, or 530, for instance, in act 604, 608, or both).

In certain embodiments, the method (e.g., 600) includes using no heat exchanger other than one or more evaporators (e.g., 540) and one or more condensers (e.g., 550) of the one or more chillers (e.g., 210), the at least one cooling coil (e.g., 120, 220, or 520) that cools air (e.g., in act 604) delivered to the space, and the at least one heat sink (e.g., 130, 230, or 530) that rejects heat (e.g., in act 608) to the environment outside the space. Further, in some embodiments, the method (e.g., 600) includes operating (e.g., in act 604) at least one supply fan (e.g., 102), for example, that moves air from the space through the at least one cooling coil (e.g., 120, 220, or 520) and back to the space. Still further, in some embodiments, the method (e.g., 600) includes operating (e.g., in act 608) at least one outdoor air fan (e.g., 103), for instance, that moves air from the environment through the at least one heat sink (e.g., 130, 230, or 530) and back to the environment. Even further, in some embodiments, the method (e.g., 600) includes operating at least one compressor (e.g., of chiller 210), for example, in the first mode of operation, in the second mode of operation, or both. Even further still, in certain embodiments, the method (e.g., 600) includes not operating the at least one compressor (e.g., of chiller 210), for instance, in the third mode of operation. Moreover, in various embodiments, the method (e.g., 600) includes (e.g., in act 604) filtering air, for example, delivered to the at least one cooling coil (e.g., 120, 220, or 520), for instance, with filter 104 shown in FIG. 1.

Referring to FIG. 5, in an example of peak ambient performance of a particular embodiment, outdoor ambient air (e.g., entering heat sink 530) is at 104 degrees Fahrenheit (F) dry bulb (db), scavenger exhaust (e.g., exiting heat sink 530) is at 123.8 F db, return air (e.g., from a data center, for instance, entering the at least one cooling coil, for example, 520) is at 100 F db, and the process supply air (e.g., delivered to the space, for instance, data center, for example, exiting the at least one cooling coil, for instance, 520), is at 80 degrees F. db. In this example, water at location 1 (i.e., the circled 1 in FIG. 5, the outlet of heat sink 530, or, entering fourth water conduit 504), is at 114 F, water at location 2 (i.e., the circled 2 in FIG. 5, the inlet of evaporator 540, or, leaving fourth water conduit 504), is at 83.9 F, and water at location 3 (i.e., the circled 3 in FIG. 5, the inlet of the at, least one cooling coil 520, or, leaving first water conduit 501), is at 70 F Further, in this example, water at location 4 (i.e., the circled 4 in FIG. 5, the outlet of the at least one cooling coil 520, or, entering second water conduit 502), is at 97.3 F, water at location 5 (i.e., the circled 5 in FIG. 5, the inlet of the one or more condensers 550, for instance, of the one or more chillers, for example, 210, or, leaving second water conduit 502), is at 114 F, and water at location 6 (i.e., the circled 6 in FIG. 5, the inlet of heat sink 530, or, leaving third water conduit 503), is at 125.1 F. Under these conditions, in this example, energy or power consumption (in kW) is: 85.6 for the chiller (e.g., 210), 23.9 for process (e.g., fan 102), 24.1 for scavenge (e.g., fan 103), 5.2 at pump A or first water pump 561, and 2.6 at pump B or second water pump 562.

In other conditions, in an example of combination performance of a particular embodiment, outdoor ambient air (e.g., entering heat sink 530) is at 83 degrees F db, scavenger exhaust (e.g., exiting heat sink 530) is at 105.9 F db, return air (e.g., from a data center, for instance, entering the at least one cooling coil, for example, 520) is (e.g., still) at 100 F db, and the process supply air (e.g., delivered to the space, for instance, data center, for example, exiting the at least one cooling coil, for instance, 520), is (e.g., still) at 80 degrees F db. In this example, water at location 1 (i.e., the circled 1 in FIG. 5, the outlet of heat sink 530, or, entering fourth water conduit 504), is at 94 F, water at location 2 (i.e., the circled 2 in FIG. 5, the inlet of evaporator 540, or, leaving fourth water conduit 504), is at 82.2 F, and water at location 3 (i.e., the circled 3 in FIG. 5, the inlet of the at least one cooling coil 520, or, leaving first water conduit 501), is (e.g., still) at 70 F. Further, in this example, water at location 4 (i.e., the circled 4 in FIG. 5, the outlet of the at least one cooling coil 520, or, entering second water conduit 502), is (e.g., still) at 97.3 F, water at location 5 (i.e., the circled 5 in FIG. 5, the inlet of the one or more condensers 550, for instance, of the one or more chillers, for example, 210, or, leaving second water conduit 502), is at 96.2 F, and water at location 6 (i.e., the circled 6 in FIG. 5, the inlet of heat sink 530, or, leaving third water conduit 503), is at 107.5 F. Under these conditions, in this example, energy or power consumption (in kW) is: 56.3 for the chiller (e.g., 210), (e.g., still) 23.9 for process (e.g., fan 102), (e.g., still) 24.1 for scavenge (e.g., fan 103), (e.g., still) 5.2 at pump A or first water pump 561, and (e.g., still) 2.6 at pump B or second water pump 562.

In yet other conditions, in an example of (e.g., top) economizer performance of a particular embodiment (e.g., mode 3), outdoor ambient air (e.g., entering heat sink 530) is at 72 degrees F db, scavenger exhaust (e.g., exiting heat sink 530) is (e.g., still) at 105.9 F db, return air (e.g., from a data center, for instance, entering the at least one cooling coil, for example, 520) is (e.g., still) at 100 F db, and the process supply air (e.g., delivered to the space, for instance, data center, for example, exiting the at least one cooling coil, for instance, 520), is (e.g., still) at 80 degrees F db. In this example, water at location 1 (i.e., the circled 1 in FIG. 5, the outlet of heat sink 530, or, entering fourth water conduit 504), is at 78 F, water at location 2 (i.e., the circled 2 in FIG. 5, the inlet of evaporator 540, or, leaving fourth water conduit 504), is at 78 F, and water at location 3 (i.e., the circled 3 in FIG. 5, the inlet of the at least one cooling coil 520, or, leaving first water conduit 501), is (e.g., also) at 78 F. Further, in this example, water at location 4 (i.e., the circled 4 in FIG. 5, the outlet of the at least one cooling coil 520, or, entering second water conduit 502), is at 92 F, water at location 5 (i.e., the circled 5 in FIG. 5, the inlet of the one or more condensers 550, for instance, of the one or more chillers, for example, 210, or, leaving second water conduit 502), is also at 92 F, and water at location 6 (i.e., the circled 6 in FIG. 5, the inlet of heat sink 530, or, leaving third water conduit 503), is also at 92 F. Under these conditions, in this example, energy or power consumption (in kW) is: 0 (zero) for the chiller (e.g., 210), (e.g., still) 23.9 for process (e.g., fan 102), (e.g., still) 24.1 for scavenge (e.g., fan 103), 2.6 at pump A or first water pump 561, and (e.g., still) 2.6 at pump B or second water pump 562. In these three examples, process supply is 61600 cfm and scavenger exhaust is 74000 cfm. Still further, referring to FIG. 1, in an example of 60 k cfm energy consumption, the evaporative cooler is operating at 2.5 gpm (including 10 percent for blowdown), the chiller (e.g., 210) tons (peak) is 80 tons, the fan energy (peak) is 140 hp, the Econet pump energy (peak) is 4.7 hp, and the chiller SA/RA pump energy (peak) is 10 hp.

Different embodiments provide different advantages. For example, in some embodiments, there is zero leakage between scavenger and process airstreams. In some embodiments, for example, outdoor loads (e.g., from data center 444) through leakage from the scavenger to the process are eliminated. Further, in some embodiments, (e.g., possible) negative pressure when leaking from the process to the scavenger is eliminated. Still further, in some embodiments, expected restart timing in the system is 60 seconds from switchover. Further still, in some embodiments, Econet or supplemental (or both) run around coil technology is used. Even further, in particular embodiments, a recovery system that generates, for example, 71% effective transfer, is used. Even further still, in certain embodiments, screw chiller reliability, offloading technology, or both, can be utilized. Moreover, in some embodiments, system capability exists to turn down to 1 percent of total load required. Further, some embodiments include factory authorized OEM, for instance, for automated logic controls, for example, with in house programmers. Various embodiments provide specific load matching, for example, to support project demands, dynamic adjustment, for instance, to maximize energy savings, for example, through air and water monitoring, multiple alarm features (e.g., critical and support, for instance, filter pressure for maintenance), or a combination thereof. Still further, some embodiments are remote monitoring capable, for example, through a VPN or a dedicated network, provide energy monitoring, for instance, to show real time consumption, trend data, or both, or a combination thereof.

Various embodiments provide (e.g., in mode 3) high temperature economizer operation without supplemental mechanical cooling. Further, many embodiments provide a very low, highly efficient PUE system design. In a number of embodiments, for example, lower main power is required, for example, at peak, for instance, resulting in smaller electrical feeds and generator sizing, among other benefits. Still further, some embodiments provide lower maintenance than alternatives, for example, no wheel maintenance, for instance, bearings, seals, purge, belts, motors, or a combination thereof. Further still, in some embodiments, filter replacement is required only on the process side (e.g., 104). In some embodiments, for example, a washable mesh is used for the scavenger. Even further, in various embodiments, low maintenance variable-speed pumping systems (e.g., 561, 562, or both) are used. Even further still, in particular embodiments, closed water loop systems are used. In some embodiments, rust inhibitors, water line filters, or both, are used. Moreover, in a number of embodiments, local services representatives are provided. In some embodiments, for example, factory authorized start-up representatives are on site.

Installation considerations of various embodiments include that, in particular embodiments, four modules are set, for instance, with two field joints to complete. Further, in a number of embodiments, 80 percent, for instance, of the piping is complete in a central plant command center. Still further, in many embodiments, water and venting are required on the site, for example, 450 gallons per unit. Even further, in a number of embodiments, wiring of the units (e.g., in the field) are limited to fan motor to inverter wiring, some controls wiring, or both. Even further still, some embodiments have multiple module configurations for units, for instance, to speed project site assembly. Further, some embodiments provide a portion of these advantages, provide partial accomplishment of some of these advantages, provide other advantages, or a combination thereof.

Various methods may further include acts of obtaining, providing, assembling, or making various components described herein or known in the art. Other embodiments include a building that includes an air conditioning unit, an HVAC unit, or a system described herein. Various methods in accordance with different embodiments include acts of selecting, making, positioning, assembling, or using certain components, as examples. Other embodiments may include performing other of these acts on the same or different components, or may include fabricating, assembling, obtaining, providing, ordering, receiving, shipping, or selling such components, or other components described herein or known in the art, as other examples. Further, various embodiments include various combinations of the components, features, and acts described herein or shown in the drawings, for example. Other embodiments may be apparent to a person of ordinary skill in the art having studied this document.

What is claimed is:

1. An air conditioning system for cooling a space, the air conditioning system comprising:
    at least one chiller comprising an evaporator, a condenser, an evaporator inlet, an evaporator outlet, a condenser inlet, and a condenser outlet;
    at least one cooling coil that cools air delivered to the space;
    at least one heat sink that rejects heat to an environment outside the space;
    a first water conduit that connects the evaporator outlet to the cooling coil;
    a second water conduit that connects the cooling coil to the condenser inlet;
    a third water conduit that connects the condenser outlet to the at least one heat sink;
    a fourth water conduit that connects the at least one heat sink to the evaporator inlet;
    at least one water pump that circulates water through the evaporator, the first water conduit, the cooling coil, the second water conduit, the condenser, the third water conduit the at least one heat sink, and the fourth water conduit;
    a further water conduit that connects the second water conduit to the fourth water conduit;
    an even further water conduit that connects the fourth water conduit to the second water conduit; and
    a water valve that controls whether the water passes through the even further water conduit that connects the fourth water conduit to the second water conduit;
    wherein:
        the further water conduit that connects the second water conduit to the fourth water conduit connects to the second water conduit between the cooling coil and the even further water conduit that connects the fourth water conduit to the second water conduit;
        the further water conduit that connects the second water conduit to the fourth water conduit connects to the fourth water conduit between the even further water conduit that connects the fourth water conduit to the second water conduit and the evaporator inlet;
        the even further water conduit that connects the fourth water conduit to the second water conduit connects to the second water conduit between the further water conduit that connects the second water conduit to the fourth water conduit and the condenser inlet; and
        the even further water conduit that connects the fourth water conduit to the second water conduit connects to the fourth water conduit between the at least one heat sink and the further water conduit that connects the second water conduit to the fourth water conduit.

2. The air conditioning system of claim 1 further comprising:
    a still further water conduit that connects the first water conduit to the second water conduit bypassing the cooling coil;
    further water valve that:
        controls how much of the water passes through the fifth still further water conduit that connects the first water conduit to the second water conduit bypassing the cooling coil; and
        controls how much of the water passes through the cooling coil;
    an additional water conduit that connects the third water conduit to the fourth water conduit bypassing the at least one heat sink; and an additional water valve that:
  controls how much of the water passes through the additional water conduit that connects the third water conduit to the fourth water conduit bypassing the at least one heat sink; and
  controls how much of the water passes through the at least one heat sink.

3. The air conditioning system of claim 1 further comprising at least one further water valve that controls whether the water passes through the further water conduit that connects the second water conduit to the fourth water conduit.

4. The air conditioning system of claim 1 further comprising a first check valve located in the further water conduit that connects the second water conduit to the fourth water conduit.

5. The air conditioning system of claim 4 further comprising a second check valve located in the even further water conduit that connects the fourth water conduit to the second water conduit.

6. The air conditioning system of claim 1 wherein the at least one water pump comprises a first water pump located in the third water conduit; and a second water pump located in the first water conduit.

7. The air conditioning system of claim 1 wherein:
  the at least one water pump comprises a first water pump and a second water pump;
  the first water pump is a first variable-speed pump;
  the second water pump is a second variable-speed pump; and
  the system controls speed of the first water pump and the second water pump to control water flow through the at least one cooling coil and through the at least one heat sink.

8. The air conditioning system of claim 1 further comprising a still further water conduit that connects the first water conduit to the second water conduit bypassing the cooling coil.

9. The air conditioning system of claim 8 further comprising a further water valve that controls how much of the water passes through the still further water conduit that connects the first water conduit to the second water conduit bypassing the cooling coil.

10. The air conditioning system of claim 9 wherein the further water valve that controls how much of the water passes through the still further water conduit that connects the first water conduit to the second water conduit bypassing the cooling coil also controls how much of the water passes through the cooling coil.

11. The air conditioning system of claim 8 further comprising an additional water conduit that connects the third water conduit to the fourth water conduit bypassing the at least one heat sink.

12. The air conditioning system of claim 1 further comprising an additional water conduit that connects the third water conduit to the fourth water conduit bypassing the at least one heat sink.

13. The air conditioning system of claim 12 further comprising an additional water valve that controls how much of the water passes through the additional water conduit that connects the third water conduit to the fourth water conduit bypassing the at least one heat sink.

14. The air conditioning system of claim 13 wherein the additional water valve that controls how much of the water passes through the additional water conduit that connects the third water conduit to the fourth water conduit bypassing the at least one heat sink also controls how much of the water passes through the at least one heat sink.

15. The air conditioning system of claim 2 further comprising an even further water valve that controls whether the water passes through the further water conduit that connects the second water conduit to the fourth water conduit.

16. The air conditioning system of claim 15 further comprising a first check valve located in the further water conduit that connects the second water conduit to the fourth water conduit; and a second check valve located in the even further water conduit that connects the second water conduit to the fourth water conduit.

17. The air conditioning system of claim 2 further comprising a first check valve located in the further water conduit that connects the second water conduit to the fourth water conduit.

18. The air conditioning system of claim 17 further comprising a second check valve located in the even further water conduit that connects the second water conduit to the fourth water conduit.

19. The air conditioning system of claim 2 further comprising a check valve located in the even further water conduit that connects the fourth water conduit to the second water conduit.

20. The air conditioning system of claim 1 further comprising a check valve located in the even further water conduit that connects the fourth water conduit to the second water conduit.

* * * * *

UNITED STATES PATENT AND TRADEMARK OFFICE
CERTIFICATE OF CORRECTION

PATENT NO. : 10,739,024 B2  
APPLICATION NO. : 15/866940  
DATED : August 11, 2020  
INVENTOR(S) : Thomas Rice Page 1 of 1

It is certified that error appears in the above-identified patent and that said Letters Patent is hereby corrected as shown below:

In the Drawings

Figure 2:
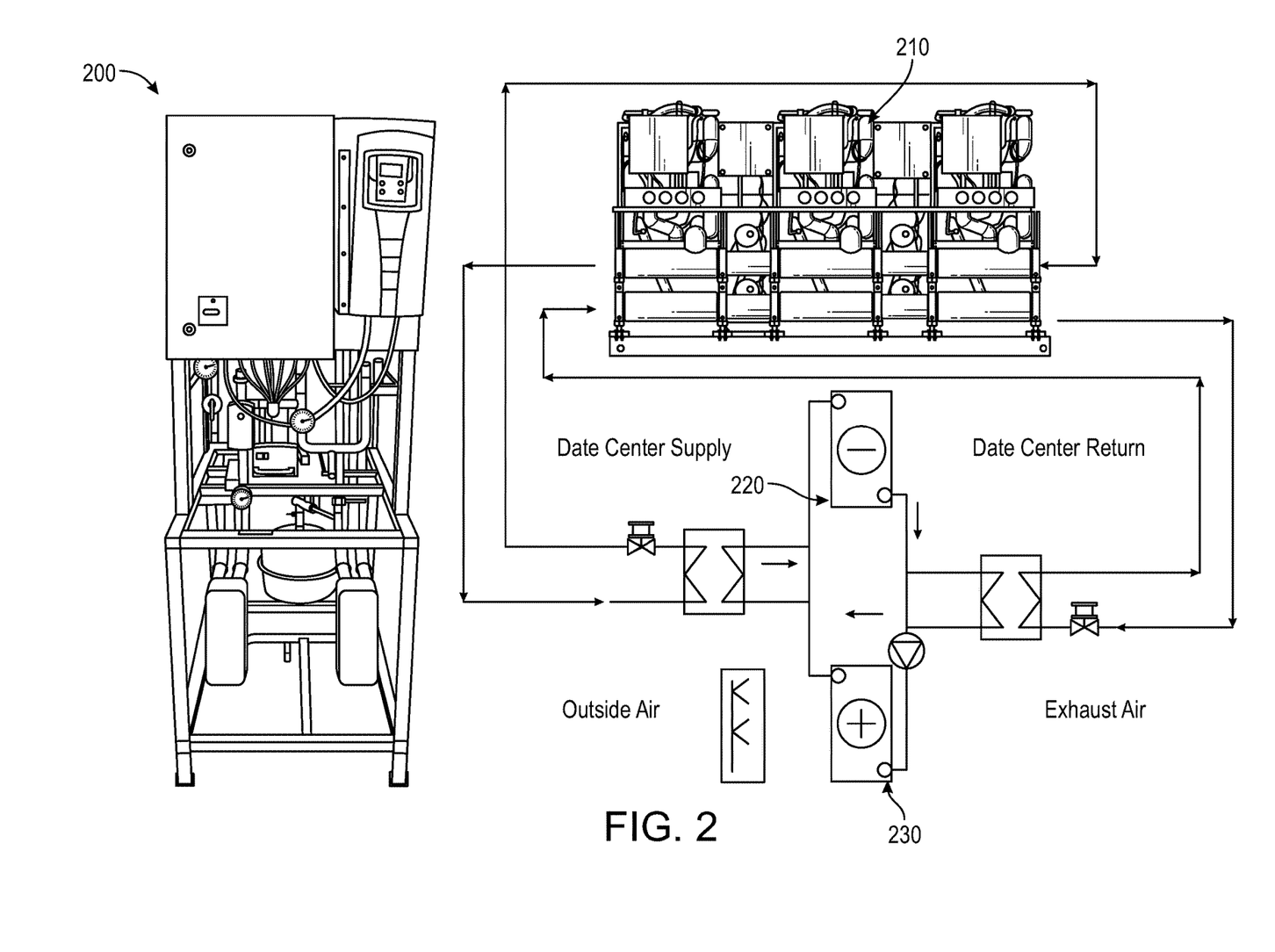
FIG. 2 is a block diagram illustrating an example of a chiller Econet integration and a schematic of an embodiment of water lines.

In FIG. 2, change "Date" to "Data" in "Date Center Supply".

In FIG. 2, change "Date" to "Data" in "Date Center Return".

Figure 3:
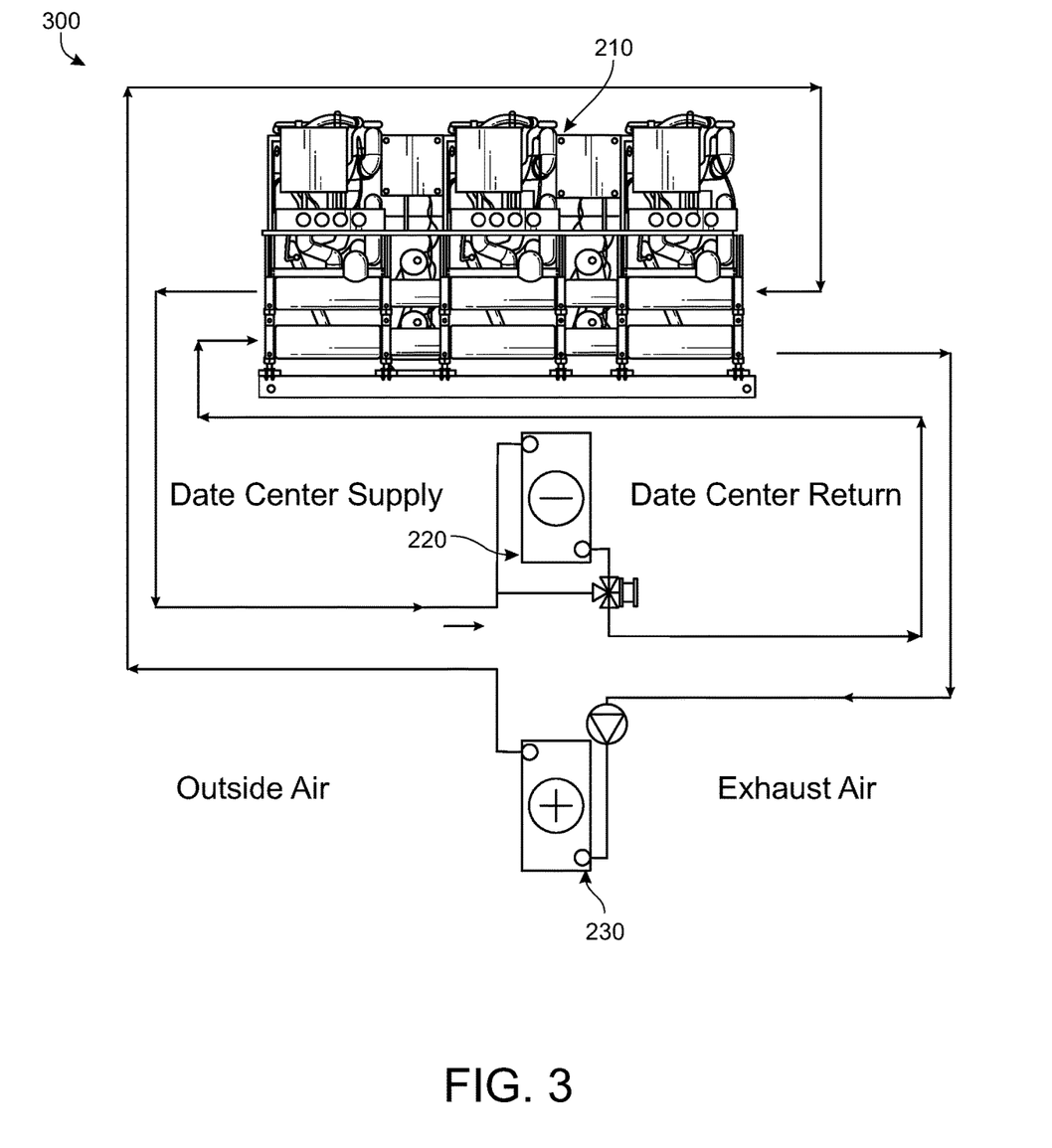
FIG. 3 is another block diagram illustrating an example of a chiller Econet integration and a schematic of an embodiment of water lines.

In FIG. 3, change "Date" to "Data" in "Date Center Supply".

In FIG. 3, change "Date" to "Data" in "Date Center Return".

In FIG. 5, change "Date" to "Data" in "Date Center Return".

In the Specification

In Column 1, Line 8, change "2016" to "2017".

In Column 1, Line 12, change "FIELD THE INVENTION" to "FIELD OF THE INVENTION".

In the Claims

In Column 20, Claim 1, Line 22, add a "," after "the third water conduit".

In Column 20, Claim 2, Line 6, add "a" before "further water valve".

In Column 20, Claim 2, Line 7, delete the word "fifth".

In Column 21, Claim 3, Line 2, change "at least one" to "a".

Signed and Sealed this  
Twentieth Day of April, 2021

Drew Hirshfeld  
*Performing the Functions and Duties of the  
Under Secretary of Commerce for Intellectual Property and  
Director of the United States Patent and Trademark Office*